(12) United States Patent
Isert

(10) Patent No.: US 11,484,976 B2
(45) Date of Patent: Nov. 1, 2022

(54) STRUCTURAL PROFILE

(71) Applicant: Isel Marketing & Sales GmbH & Co. KG, Berlin-Charlottenburg (DE)

(72) Inventor: Hugo Isert, Dermbach (DE)

(73) Assignee: isel Marketing & Sales GmbH & Co. KG, Berlin-Charlottenburg (DE)

( * ) Notice: Subject to any disclaimer, the term of this patent is extended or adjusted under 35 U.S.C. 154(b) by 0 days.

(21) Appl. No.: 17/057,784

(22) PCT Filed: May 14, 2019

(86) PCT No.: PCT/DE2019/000131
§ 371 (c)(1),
(2) Date: Nov. 23, 2020

(87) PCT Pub. No.: WO2019/223821
PCT Pub. Date: Nov. 28, 2019

(65) Prior Publication Data
US 2021/0197328 A1    Jul. 1, 2021

(30) Foreign Application Priority Data
May 24, 2018   (DE) .......................... 202018002529.1

(51) Int. Cl.
*B23Q 1/01*    (2006.01)
*B23Q 1/42*    (2006.01)
*B23Q 1/60*    (2006.01)

(52) U.S. Cl.
CPC ............... *B23Q 1/015* (2013.01); *B23Q 1/42* (2013.01); *B23Q 1/601* (2013.01)

(58) Field of Classification Search
CPC ........ A47B 96/1466; F16B 7/18; F16B 7/187; B65G 21/06
See application file for complete search history.

(56) References Cited

U.S. PATENT DOCUMENTS

2012/0125870 A1* 5/2012 Decroos ................ F16B 7/0406
                                                       211/26

FOREIGN PATENT DOCUMENTS

| DE | 3211404 A1 * | 9/1983 | ............ A47B 96/14 |
| DE | 3211404 A1 | 9/1983 | |
| DE | 3930676 A1 | 3/1991 | |
| DE | 20207435 U1 | 9/2003 | |

* cited by examiner

*Primary Examiner* — Tyrone V Hall, Jr.
(74) *Attorney, Agent, or Firm* — Laurence A. Greenberg; Werner H. Sterner; Ralph E. Locher

(57) ABSTRACT

A structural profile includes an outer contour that has at least one longitudinal side and one transverse side. The longitudinal side and the transverse side are transverse to one another. The longitudinal side has a longitudinal-side groove and the transverse side has a transverse-side groove. The grooves each have a respective groove cross section in which a circle is capable of being inscribed. Longitudinal center axes of the grooves are arranged in a common groove plane, and the groove plane is parallel to a longitudinal center plane of the structural profile.

6 Claims, 5 Drawing Sheets

STRUCTURAL PROFILE

BACKGROUND OF THE INVENTION

Field of the Invention

The invention relates to a structural profile to be used, in particular, for the modular construction of frame structures.

Structural profiles with different designs of the cross-sectional area are known from the state of the art.

SUMMARY OF THE INVENTION

The task of the invention is to provide a structural profile which offers a multitude of possibilities for the construction of frame structures, can be installed subsequently in existing frame structures, is suitable for supporting surface elements, and yet is easy to assemble and disassemble.

The task is solved by the features described in the independent claim. Preferred further embodiments result from the sub-claims.

The structural profile according to the invention has an outer contour with at least one longitudinal side and at least one transverse side which are arranged transversely to one another. Preferably, the outer contour has a rectangular shape so that there are one additional long side and one additional transverse side. However, embodiments are also possible in which the outer contour has one or more curved wall sections apart from the invention's at least one longitudinal side and at least one transverse side.

According to the invention, the at least one longitudinal side has a longitudinal-side groove and the at least one transverse side has a transverse-side groove. The longitudinal-side groove and the transverse-side groove are also collectively referred to as the grooves.

The invention does not exclude an embodiment in which, in addition to the grooves according to the invention, further grooves are provided on the structural profile which may have the same geometry or different ones. Hereinafter, such grooves are also referred to as the other grooves.

According to the invention, the two invention's grooves, i.e. the longitudinal-side groove and the transverse-side groove, have an access to a front end of the structural profile. This design allows to connect the structural profile at the front end to a connection partner, for example, a further structural profile according to the invention or to another structural profile. Hereinafter, such a connection partner is also referred to as a support profile. Access is to be understood in such a way that the grooves are led to the front end so that, for example, profile connectors or other connecting elements can be inserted in the grooves at the axially front end, i.e. in the longitudinal axis of the structural profile.

Preferably, the structural profile is an extruded profile, and in a particularly preferable design an extruded aluminium profile. In this case, the front ends are released when the profile is cut to length.

According to the invention, the grooves, have a cross section in which it is possible to inscribe a circle.

The groove cross section according to the invention is based on the fact that due to this groove cross section it is possible to fix, for example, an anchor sleeve with a round cross section in the grooves. The fixation of the anchor sleeves in the grooves can be preferably achieved by screwing, but also by pressing or gluing. A groove cross section into which a circle can be inscribed is any cross section that leads to at least three points of contact to an inscribed circle. This means that the position of an essentially cylindrical body such as a thread screw can be determined in the groove. The points of contact can be formed by edges or surfaces in the groove. In particular, it is also possible to produce the groove cross section in a partially circular design.

The longitudinal centre axes of the grooves are arranged in a common groove plane. The common groove plane is arranged parallel to a longitudinal centre plane of the structural profile. If fasteners are inserted in the grooves at the front end during assembly, their central axes are thus in one line.

Specific advantages of the invention result in particular from the fact that the longitudinal centre axes of the grooves are arranged in a common plane and thus the longitudinal centre axes of the grooves are in a common line. Consequently, all fasteners inserted in the grooves can engage in one and the same groove of a support profile.

Depending on the application, fasteners are not installed in the transverse-side groove so that it remains free and can be used for the insertion of a panel material. In this first application, the longitudinal-side grooves remain accessible when panel material is inserted and can be used for the fasteners and for access to the fasteners, whereas in the case of profiles according to the state of the art, the panel material must be disengaged because fasteners occupy the transverse-side groove. Furthermore, in such a state-of-the-art installation, the fastener in the transverse-side groove cannot be accessed by tools any longer after the insertion of the panel material in the transverse-side groove.

In an alternative application, however, the structural profile also allows to insert the fasteners in the transverse-side groove for a connection to a support profile, thus keeping the longitudinal-side groove free. In this second application, the longitudinal-side groove can be used for other installation purposes without restriction.

In a third application, in which a high torsional load is to be expected on the structural profile in the mounted position, the structural profile according to the invention also allows to use fasteners in both the longitudinal-side groove and the transverse-side groove. In this application, torques acting on the structural profile can be reliably transmitted to the support profile via two points spaced apart in the longitudinal axis of a support profile.

If anchor sleeves are inserted without protrusion in the front end of the structural profile, it will be possible to swing the structural profile into a closed frame of two support profiles. As a special advantage, it is not necessary then to open the frame intricately beforehand to be able to position the structural profile.

Furthermore, the structural profile according to the invention offers the advantage to use anchor sleeves and thus to provide a connection solution that does not interfere with the structural integrity of the structural profile. Advantageously, this design makes the otherwise required drilling or milling work superfluous and does not restrict the further use of the structural profile.

Before installing the anchor sleeves, it is also advantageously possible to insert connecting screws with a screw head the size of which exceeds the lateral opening of the groove. Connecting screws inserted in this way cannot fall out. This will be particularly advantageous if the construction is to be modified frequently, for example in the case of exhibition stands.

Another advantage of the structural profile is the fact that it can also be combined with other commercially available structural profile systems. Thus, the structural profile according to the invention can be attached to commercially available structural profiles and, vice versa, commercially available structural profiles can also be attached to the structural profile according to the invention.

According to an advantageous further embodiment, the structural profile has at least two longitudinal-side grooves. According to this further embodiment, both longitudinal-side grooves are arranged in the longitudinal side.

This further embodiment is particularly advantageous for the application in which the structural profile shall be used to fix a panel material. In this application, the transverse-side groove is occupied by the panel material. Like the first longitudinal-side groove, the second longitudinal-side groove can then accommodate a fastener and create two fixation points in one longitudinal-side groove of a support profile, thus preventing the structural profile from turning out of its position after being mounted to the support profile.

If the structural profile has two longitudinal-side grooves and two opposite transverse-side grooves, up to four joints to a longitudinal-side groove of a support profile can be used for fixation purposes.

If, in contrast, only the two longitudinal-side grooves are used for fixation in the longitudinal-side groove of a support profile, the two transverse-side grooves remain free, which means that the panel material can be used on both transverse sides. In this way, particularly large surface-forming housings can be advantageously created.

In the state of the art, however, the grooves are blocked by the fasteners, at least near the front end, after the connection to a support profile so that the panel material must be disengaged at its corners. If the disengaged panels are inserted, they on their part block the access to the connecting elements now. If there are at least two longitudinal-side grooves, a particularly torsion-resistant connection to a support profile can be achieved and the transverse-side groove or the transverse-side grooves of the profile can still be used for the insertion of a panel material.

According to an advantageous further embodiment, the structural profile has a longitudinal-side groove cross section with an upper and a lower section.

A circle can be inscribed in the lower section. The upper section is designed as a T groove.

In the known state-of-the-art structural profiles, there are usually longitudinal-side grooves and a borehole in the middle of the cross section.

In the presented further embodiment of the structural profile according to the invention, a lateral access to the lower section is provided and preferably designed as a laterally open central borehole. The lateral access to the lower section, which passes through the upper section, makes it possible to use also the lower section for an attachment to a support profile. Preferably, the lower section has a round cross section with an increased diameter and can therefore accommodate larger screws of larger diameters than the upper section. In particular, the lower section is preferably designed to accommodate fasteners with screws having a size of 8 mm. This design increases the strength of the construction because higher bending and torsion moments can be absorbed.

The use of additional fasteners in the upper section can further stabilize the structural profile when it is connected to a support profile at the front end. Firstly, this can be done, if the structural profile is arranged in such a way that the longitudinal centre axes of the upper and lower sections are positioned along a longitudinal-side groove of the support profile. Secondly, this can be done if the support profile has two fixation points, in particular by two longitudinal-side grooves, when the longitudinal central axes of the upper and lower sections are aligned transversely, wherein the two longitudinal-side grooves of the support profile are then positioned at a distance to one another which corresponds to the distance between the longitudinal central axes of the upper and lower sections.

Moreover, the upper section allows the fixation of other assembly partners, even if the lower section is occupied with fasteners.

Due to the design of the upper section as a T slot, hammer-head screws or sliding blocks can be used as fasteners.

According to an advantageous further embodiment, at least one groove has two opposite plane-parallel groove walls, wherein each of the groove walls has at least two laterally surface sections which are laterally spaced apart.

Laterally spaced apart means that one surface section is closer to the base of the groove than the other. The distance between the groove walls is hereinafter also referred to as rim width.

The two laterally spaced surface sections of a groove wall are positioned on a common plane.

A special advantage is given when the groove takes up panel material with a material thickness corresponding to the rim width. In this case, there are several supporting points on each groove wall in each sectional plane, which clamp the panel material better in the sense of the Euler's formula and additionally stabilize the panel material.

This design results in a cross section of the grooves which is also very advantageous for the insertion of flat strips. For example, LED or magnetic strips can be inserted.

According to an advantageous further embodiment, an inscribed circle has four points of contact to the groove walls and at least one point of contact to a groove base.

In conventional T slots of structural profiles, only three points of contact are regularly achieved.

Since a fastener, such as an anchor sleeve, has a round cross section, which preferably corresponds to the inscribed circle, the thread works its way into the material of the structural profile at five instead of three points and is thus anchored more firmly.

The invention is described in more detail as an embodiment by means of the following figures.

DETAILED DESCRIPTION OF THE INVENTION

Figure 1:
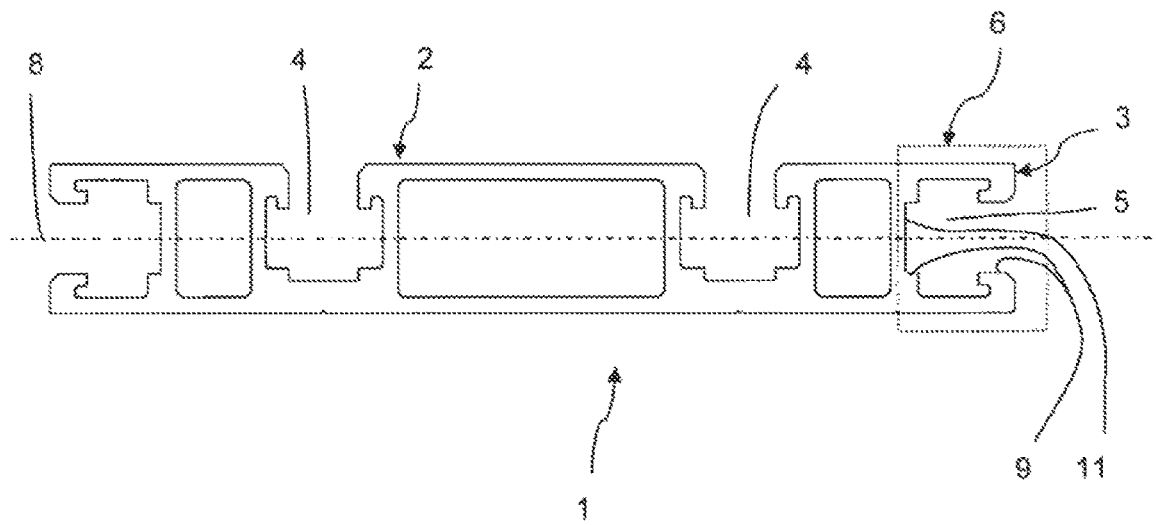
FIG. 1 Cross section of the structural profile (flat)
FIG. 2 Cross section of the structural profile (medium)
FIG. 3 Cross section of the structural profile (high)
FIG. 4 Cross section of the structural profile (transversely mounted)
FIG. 5 Exploded view
FIG. 6 Detail view of the cross section with inscribed circles
FIG. 7 Detail view of the cross section with inserted panel material.

FIG. 1 shows a cross section of a first example of the structural profile in a flat embodiment in which the outer contour 1 has a longitudinal side 2 with a longitudinal-side groove 4 and a transverse side 3 with a transverse-side groove 5. As shown in FIG. 1 and represented by the dotted line, the longitudinal centre axes of the grooves 4, 5 are located in a common groove plane corresponding to the longitudinal centre plane 8 of the structural profile. In this embodiment, the longitudinal side 2 additionally has a further longitudinal-side groove 4. Furthermore, in this embodiment the outer contour 1 has a further transverse side with a further transverse-side groove (in FIG. 1 without reference numeral).

The groove cross section 6 is partially highlighted in the figures by an angular enclosure illustrated in a dotted line. In this embodiment, the groove cross section 6 of both the longitudinal-side grooves and the transverse-side grooves 5 has a flat groove base 11 and spaced surface sections 9. In the first embodiment, all grooves 4, 5 have the same groove cross section 6 with a groove base 11 and spaced surface sections 9; nevertheless; for reasons of clarity, only the transverse-side groove 5 is provided with the reference numerals 6, 9 and 11.

Figure 2:
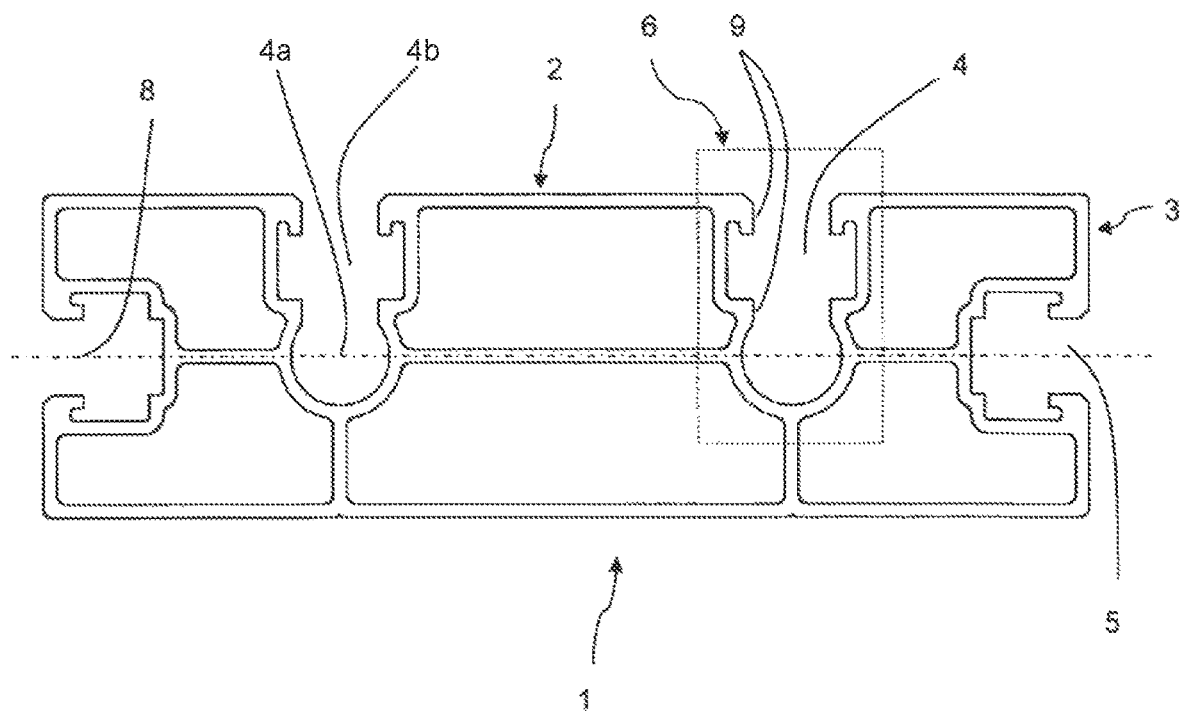

FIG. 2 shows a cross section of a second embodiment. It is an embodiment with a medium profile height. Here, the groove cross section 6 has an upper section 4b and a lower section 4a.

The upper section 4b has a rectangular cross section and additionally a T slot. The lower section 4a is connected to the upper section and has a round cross section. The longitudinal centre axis of the transverse-side groove 5 and the longitudinal centre axis of the lower section 4a are positioned both on the longitudinal centre plane 8. In addition, the descriptions in FIG. 1 apply accordingly to FIG. 2.

Figure 3:
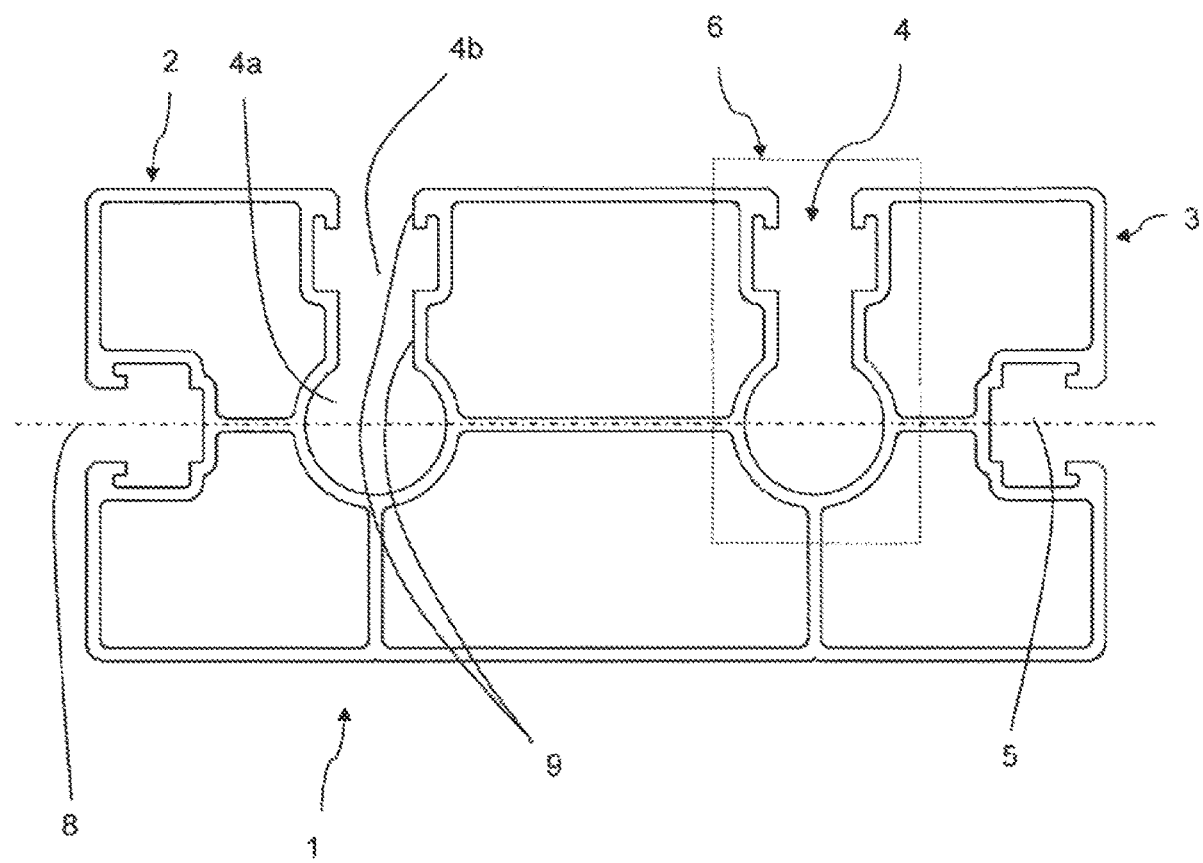

FIG. 3 shows a cross section of a third embodiment. It is an embodiment with a high profile height. The lower section 4a is connected to the upper section 4b of the longitudinal-side groove 4, as it is the case in the design of the second embodiment with the medium profile height. The longitudinal centre plane 8 of the lower section 4a and the longitudinal centre axes 8 of the transverse-side grooves 5 are in a common plane. Compared to the embodiments in FIG. 1 and FIG. 2, the lower surface section of the spaced surface sections 9 is extended towards the lower section 4a. The diameter of the lower section 4a is increased in comparison to the second embodiment so that fasteners with M8 screw size can be used in the lower section 4a according to FIG. 3. Apart from that, the geometry of the cross section is essentially the same as in the second embodiment. In addition, the descriptions in FIG. 1 apply accordingly to FIG. 3.

Figure 4:
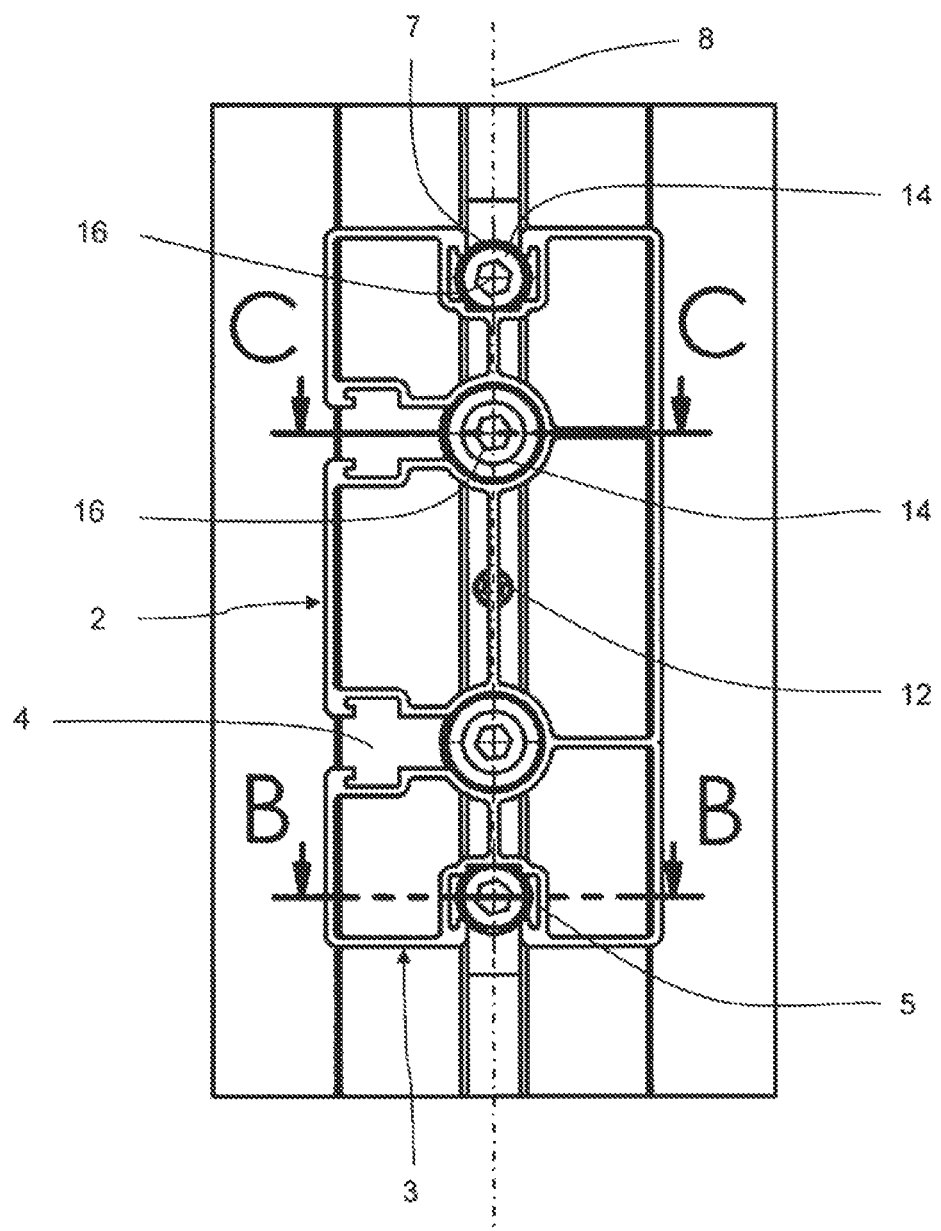
Figure 6:
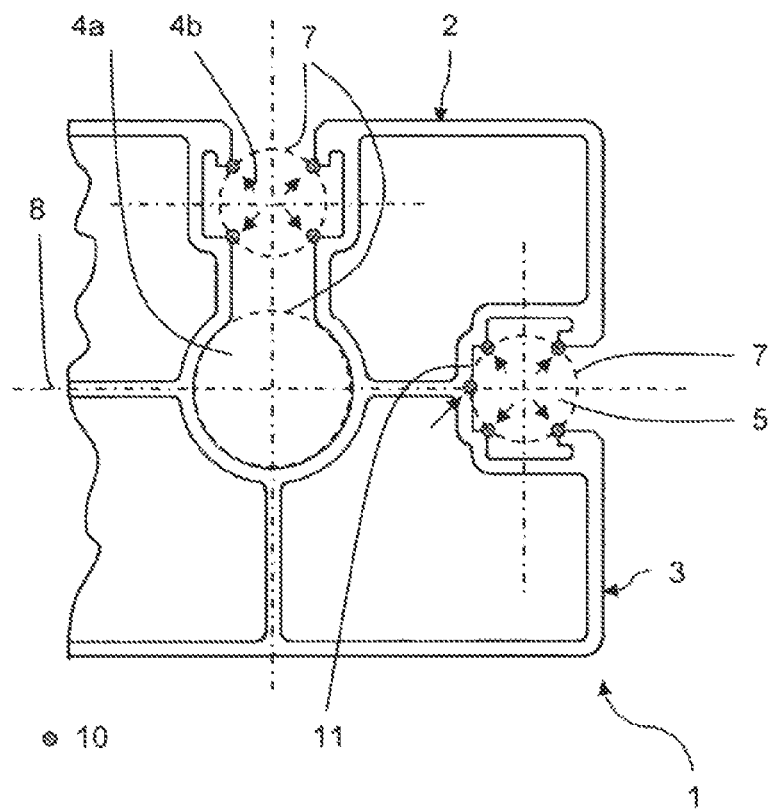

FIG. 4 shows a cross section of a structural profile the front end of which is mounted on one longitudinal side of a support profile. The structural profile corresponds to the third embodiment according to FIG. 3. In this design, the fixation is achieved by the use of four screws 16 in four anchor sleeves 14. The thread outer diameter of the anchor sleeves always corresponds to the inscribable circle 7. As the diameter of the lower sections 4a is increased, the anchor sleeves 14 and the screws 16 in the lower sections 4a of the longitudinal-side grooves 4 also have a greater diameter than the anchor sleeves 14 and the screws 16 in the transverse-side grooves 5. In the transverse-side grooves 5, five points of contact 10, which are shown in more detail in FIG. 6, are created in the cross section. FIG. 4 shows in particular that, due to the arrangement of the longitudinal centre axes of the grooves 4, 5 in the longitudinal centre plane 8 of the structural profile according to the invention, the screws 16 of all grooves 4, 5 can engage in one and the same longitudinal-side groove of the support profile.

Figure 5:
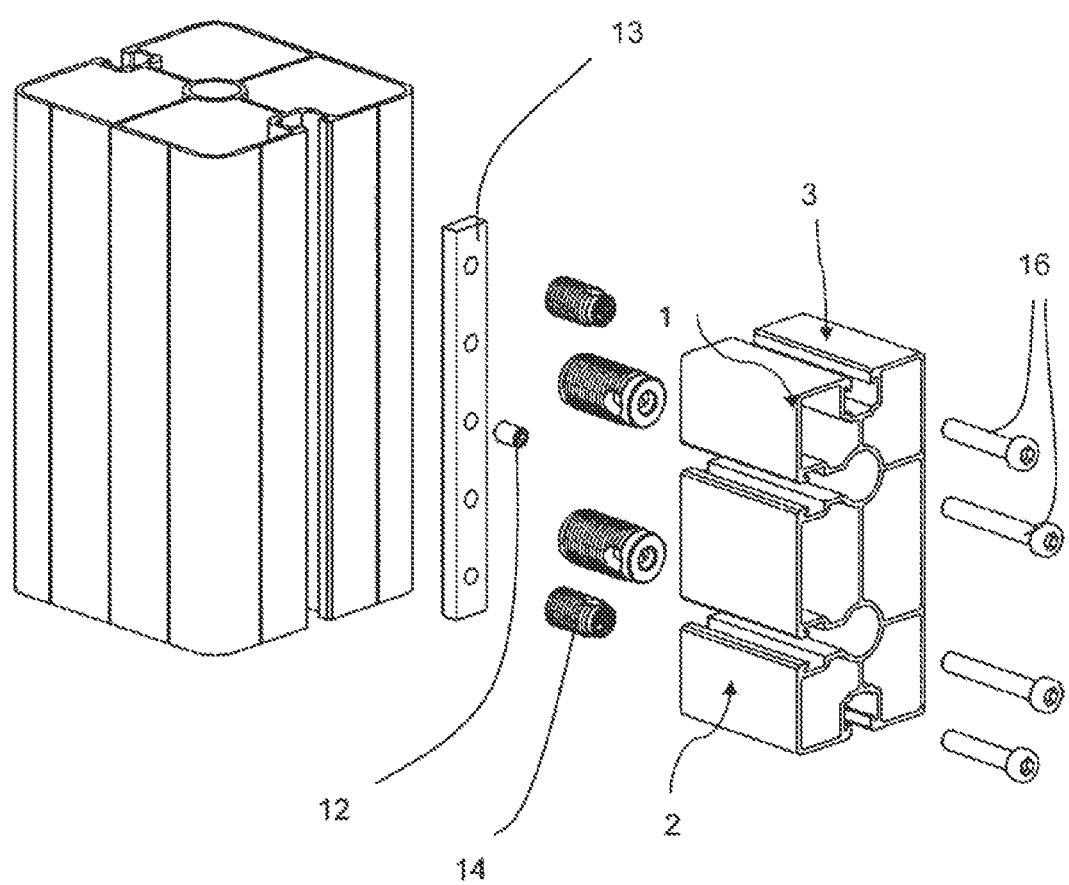

FIG. 5 is an isometric exploded view of a mounted structural profile according to FIG. 4. The four anchor sleeves 14 are screwed into the front end of the structural profile without projection and fixed with screws 16 to the profile anchor 13, which is previously inserted in a longitudinal-side groove of another structural profile, referred to as a support profile in this specification. A fixation pin 12 facilitates the installation of the structural profile by pressing the profile anchor 13 against the base of the longitudinal-side groove of the support profile and thus prevents it from getting out of place along the longitudinal-side groove during assembly.

The construction also allows to swivel cross braces into existing frames at a fixed distance between two support profiles, wherein the frame does not have to be opened.

FIG. 6 is a detailed view of the cross section in which the circles 7 are inscribed, in particular to demonstrate the points of contact 10. For clarification, the points of contact 10 are shown here in a special manner and each point is highlighted by an arrow. The diameter of the inscribed circles 7 corresponds approximately to the internal thread diameter of the anchor sleeves 14. The points of contact 10 illustrate the points where the thread of the anchor sleeves 14 works its way into the material of the structural profile.

In this embodiment, the structural profile is designed in such a way that four points of contact 10 to the groove walls are formed in the transverse-side groove 5 and in the upper section 4b of the longitudinal-side groove 4. In addition, a further point of contact 10 to the groove base 11 is formed in the transverse-side groove 5. The high number of points of contact 10 provides a firmer anchorage of the anchor sleeves 14 after being screwed in, as the force is distributed over five points of contact arranged at great angular distances. The lower section 4a of the longitudinal-side groove 4, which corresponds to a central borehole, even allows to use more than three-quarters of the circumference of an inscribed circle 7 as a contact surface for anchoring the anchor sleeves 14. This design makes the anchorage very stable on the one hand, and on the other hand the greater diameter makes it possible to use more robust screws 16.

Figure 7:
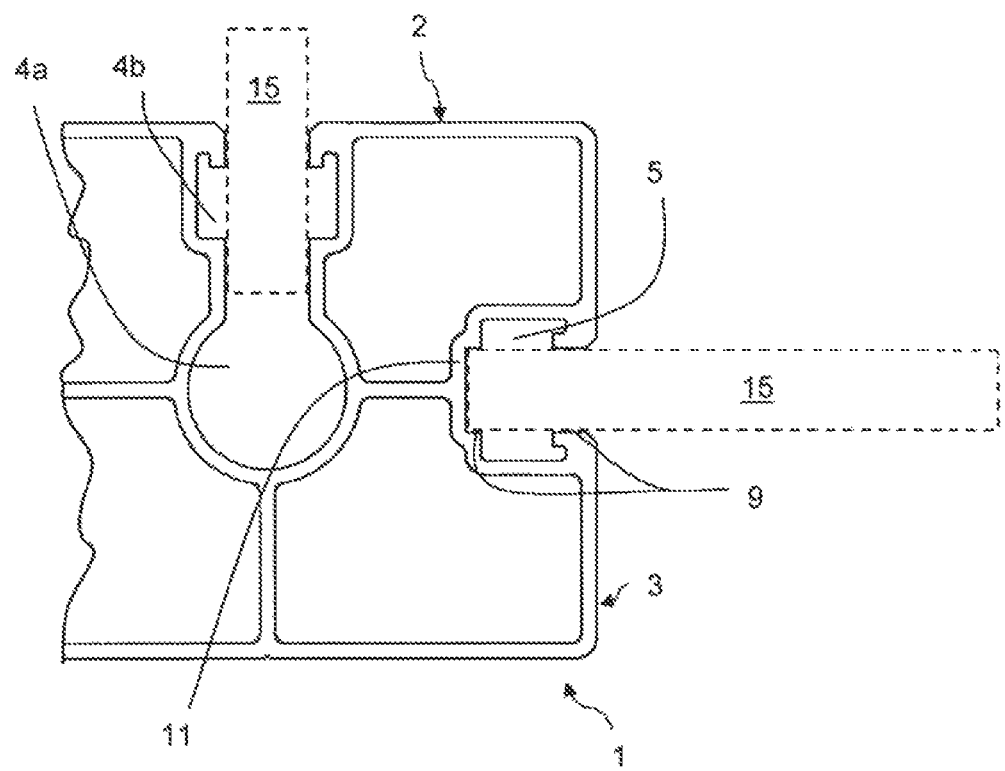

FIG. 7 is a detailed view of the cross section of the structural profile, in which cladding panels 15 have been inserted into the longitudinal-side groove 4 and transverse-side groove 5 of the outer contour. The spaced surface sections 9 are always arranged in a common plane and the planes of the spaced surface sections 9, positioned opposite to each other in a groove, are parallel to each other. Thus, the distance between the spaced surface sections 9 positioned opposite to each other in a groove is also constant. The panel material can thus be pushed into the grooves with a positive fit and is clamped and stabilized against buckling in the sense of Euler's formula.

LIST OF REFERENCE NUMERALS 1 outer contour
2 longitudinal side
3 transverse side
4 longitudinal-side groove
4a lower section
4b upper section
5 transverse-side groove
6 groove cross section
7 inscribable circle
8 longitudinal centre plane
9 spaced surface sections
10 points of contact
11 groove base
12 fixation pin
13 profile anchor
14 anchor sleeve
15 panel material
16 screws

The invention claimed is:

1. A structural profile, comprising:
   an outer contour having at least one longitudinal side and one transverse side, said longitudinal side and said transverse side being transverse to one another;
   said longitudinal side having a longitudinal-side groove and said transverse side having a transverse-side groove;
   said grooves each having a respective groove cross section in which a circle is capable of being inscribed;
   longitudinal center axes of said transverse-side and longitudinal-side grooves being arranged in a common groove plane and said groove plane being parallel to a longitudinal center plane of the structural profile;
   said respective groove cross section of said longitudinal-side groove having a lower section and an upper section, said lower section and said upper section being aligned on a median plane orthogonally arranged to the common groove plane, said lower section having a partially circular shape with a center point arranged in the common groove plane, said upper section being a T-slot.

2. The structural profile according to claim 1, wherein said longitudinal-side groove is two longitudinal-side grooves.

3. The structural profile according to claim 1, wherein at least one of said transverse-side or longitudinal-side grooves has two groove walls in a plane-parallel position opposite to one another, each groove wall of said two groove walls has at least two spaced surface sections, said two spaced surface sections of each said groove wall are in the same plane.

4. The structural profile according to claim 3, wherein said at least one of said transverse-side or longitudinal-side grooves has a groove base, and an inscribable circle has at least four points of contact to said groove walls and at least one point of contact to said groove base.

5. The structural profile according to claim 1, wherein said T-slot has a protrusion extending inwardly, said protrusion defines a recess area.

6. The structural profile according to claim 1, wherein said longitudinal center plane is orthogonal to said transverse side.

* * * * *